United States Patent
Candelaria et al.

(10) Patent No.: US 8,332,581 B2
(45) Date of Patent: Dec. 11, 2012

(54) STALE TRACK INITIALIZATION IN A STORAGE CONTROLLER

(75) Inventors: Susan K. Candelaria, Tucson, AZ (US); Kurt A. Lovrien, Tucson, AZ (US); James D. Marwood, Jr., Tucson, AZ (US); Beth A. Peterson, Tucson, AZ (US); Kenneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 11/837,833

(22) Filed: Aug. 13, 2007

(65) Prior Publication Data
US 2009/0049265 A1 Feb. 19, 2009

(51) Int. Cl.
*G06F 12/00* (2006.01)
(52) U.S. Cl. .......................... 711/112; 711/161
(58) Field of Classification Search ............... 711/112, 711/166, 170, 171, 156, 161; 707/206, 1; 713/1
See application file for complete search history.

(56) References Cited

U.S. PATENT DOCUMENTS

| | | | | |
|---|---|---|---|---|
| 5,450,384 A * | 9/1995 | Dahman et al. | ............... | 711/112 |
| 6,832,290 B2 * | 12/2004 | Todd | ............... | 711/113 |
| 6,977,847 B2 * | 12/2005 | Lasser et al. | ............. | 365/185.33 |
| 7,099,995 B2 * | 8/2006 | Springer et al. | ............... | 711/114 |
| 7,131,050 B2 | 10/2006 | Holt | | |
| 2003/0033502 A1 * | 2/2003 | Matsuzaki | ............. | 712/200 |
| 2003/0163777 A1 * | 8/2003 | Holt | ............... | 714/763 |
| 2005/0138318 A1 * | 6/2005 | Ash et al. | ............. | 711/170 |
| 2005/0138526 A1 * | 6/2005 | Stouffer et al. | ............. | 714/770 |
| 2005/0257097 A1 * | 11/2005 | Jarvis et al. | ............. | 714/42 |
| 2006/0106829 A1 * | 5/2006 | Budaya et al. | ............. | 707/100 |
| 2006/0106971 A1 * | 5/2006 | Mahar et al. | ............. | 711/100 |
| 2007/0094570 A1 * | 4/2007 | Duncan et al. | ............. | 714/763 |
| 2008/0162817 A1 * | 7/2008 | Batterywala | ............. | 711/118 |

OTHER PUBLICATIONS

Candelaria, et al., "Stale Track Initialization in a Storage Controller;" U.S. Appl. No. 11/837,843, filed Aug. 13, 2007.

* cited by examiner

*Primary Examiner* — Jared Rutz
(74) *Attorney, Agent, or Firm* — Dan Shifrin

(57) ABSTRACT

Deleting a data volume from a storage system and freeing its storage space to make it available to be allocated to a new volume is accomplished by only zeroing associated metadata for the tracks contained in the freed storage space which is then reused in a new volume allocation and an attempt is made by the new volume to read a first record R0 of a track. A determination is made as to whether a first user record R1 of the volume is stale If the first record R0 is stale. If record R1 is stale, the metadata or track format description (TFD) is modified whereby the entire track is indicated as being uninitialized and the first record R0 is uninitialized. If record R1 is not stale, the first record R0 is regenerated and the TFD is modified whereby the entire track is indicated as being initialized.

12 Claims, 2 Drawing Sheets

STALE TRACK INITIALIZATION IN A STORAGE CONTROLLER

TECHNICAL FIELD

The present invention relates generally to data storage controllers and, in particular, to initializing residual data tracks

BACKGROUND ART

A storage controller, such as the DS8000™ series of enterprise disk systems marketed by IBM Corporation, manages the operation of disk storage devices by processing requests received from one or more hosts to read data volumes from or write (record) data volumes to one or more storage devices. The data in a logical volume are written to the storage devices as one or more tracks, each track having a plurality of records. A first record, R0, serves as a marker, indicating the beginning of a new track. The following records, R1 through $R_j$, contain the actual customer data.

SUMMARY OF THE INVENTION

The present invention provides a method for deleting a data volume from a storage system. The method comprises initializing the volume by only zeroing associated cache metadata for the tracks on the volume and attempting to read a first record R0 of a track. The method further comprises determining whether a first user record R1 of the volume is stale If the first record R0 is stale. If record R1 is stale, a track format description (TFD) is modified whereby the entire track is indicated as being uninitialized and the first record R0 is uninitialized. If record R1 is not stale, the first record R0 is regenerated and the TFD is modified whereby the entire track is indicated as being initialized. The present invention further provides a method for deploying computing infrastructure, comprising integrating computer readable code into a computing system, wherein the code, in combination with the computing system, is capable of performing the steps of the foregoing method.

The present invention also provides a data storage controller for managing data volumes stored in tracks recorded on a storage device. The controller comprises a cache for storing metadata associated with data stored in a track of a first volume and a processor. The processor is programmed to direct that the first volume be deleted from the storage device, uninitialize a first record R0 of the track to re-initialize the volume, attempt to read the record R0 and determine whether a first user record R1 of the volume is stale if the record R0 is stale. The controller is further programmed to, if record R1 is stale, modify a track format description (TFD) whereby the entire track is indicated as being uninitialized and uninitializing the first record R0. The controller is also programmed to, if record R1 is not stale, regenerate the first record R0 and modify the TFD whereby the entire track is indicated as being initialized.

The present invention also provides a computer program product of a computer readable medium usable with a programmable computer and having computer-readable code embodied therein for deleting a data volume from a storage system. The computer-readable code comprises instructions for executing the following. The instructions comprise initializing the volume by only zeroing associated cache metadata for the tracks on the volume and attempting to read a first record R0 of a track. The instructions further comprise determining whether a first user record R1 of the volume is stale If the first record R0 is stale. If record R1 is stale, a track format description (TFD) is modified whereby the entire track is indicated as being uninitialized and the first record R0 is uninitialized. If record R1 is not stale, the first record R0 is regenerated and the TFD is modified whereby the entire track is indicated as being initialized.

DETAILED DESCRIPTION OF THE PREFERRED EMBODIMENT

Metadata, containing information about associated tracks, is stored in a cache in the storage controller and permanently on the storage devices. The metadata includes a track format description (TFD) which, among other information, includes an indication of whether tracks of the volume has been initialized. All sectors of an uninitialized track contain zeros. A track is considered initialized once it has a valid R0.

Typically, when a volume is deleted or erased, the storage space containing the customer tracks is freed to be reused and is cleared by setting all of its sectors to 0. The storage space allocated to a new volume may then be re-written without having to be reinitialized. However, clearing the tracks requires a significant amount of time to complete, during which normal operations may be restricted. To some customers, such a delay is an unacceptable degradation of performance and a high cost of time. One solution that has been tried to decrease the time required for an erasure is to clear or zero out only the metadata storage area that was associated with the customer storage space released by the action of deleting the volume, but not the customer tracks, so that the TFD will indicate that the track is uninitialized. Physically, the storage space of the "deleted" volume will still contain prior, stale customer tracks. Due to the updated metadata, the stale data will not be "visible" or available to the host. However, if the updated metadata stored in the cache becomes invalidated and if the host attempts to access the stale track, the cache will regenerate the track metadata from the actual, though stale, track contents. The stale track will thus become visible to the host.

Figure 1:
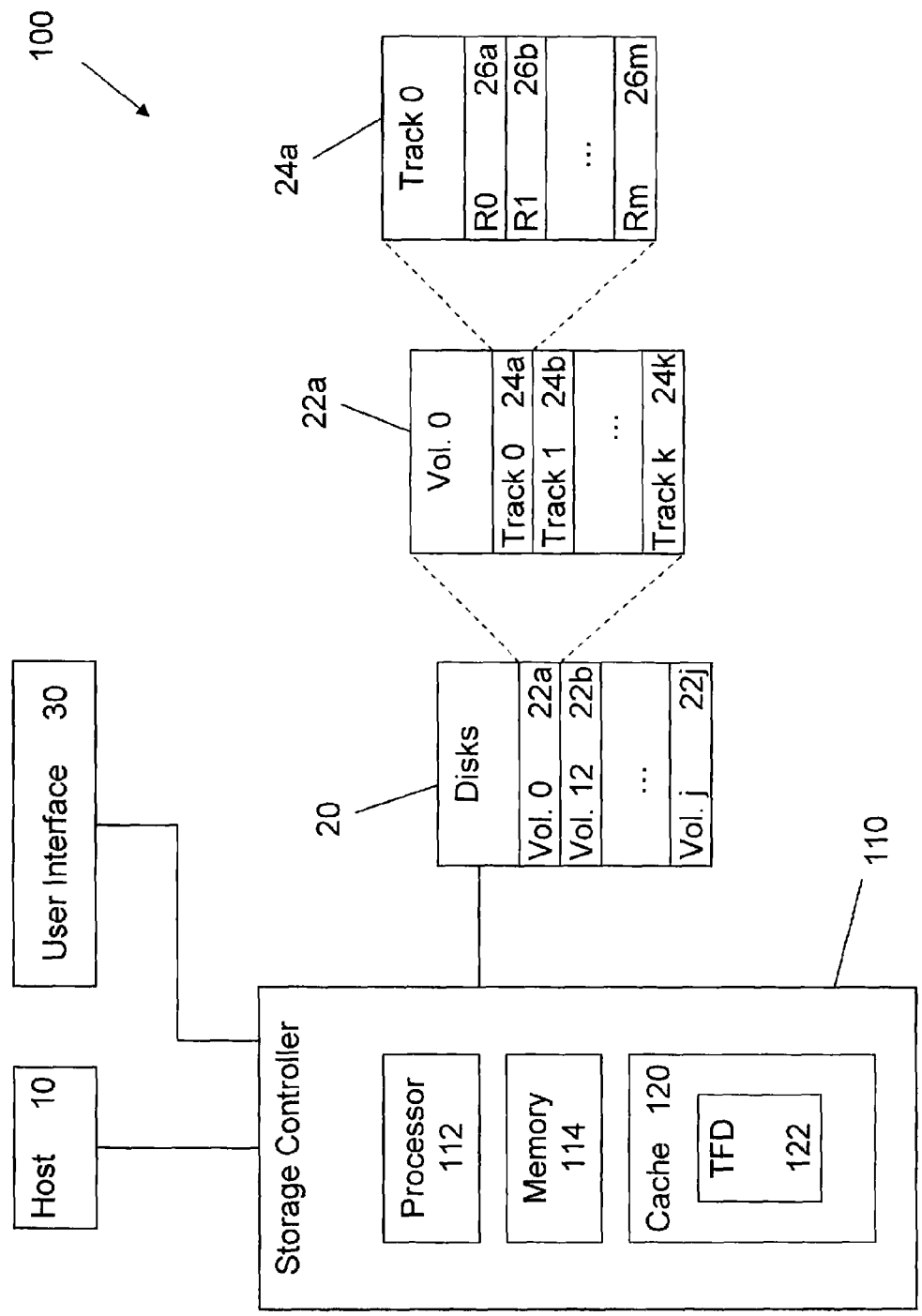
FIG. 1 illustrates a storage controller in which the present invention may be implemented.

FIG. 1 illustrates a storage system 100 in which the present invention may be implemented. A storage controller 110 receives data read and write requests from a host 10 and transmits and receives data to and from the host 10. The storage controller 110 further manages data read from and written to one or more storage devices 20. The storage devices 20 may be hard disks (HDDs) or other storage media. The storage controller includes a processor 112 and a memory 114 which stores, among other information, computer-readable code comprising instructions to be executed by the processor 112. The storage controller 110 also includes a cache 120 which stores, among other information, a track format description (TFD) 122 for each track. The TFD is also destaged onto an HDD. A user interface 30 may be used by a system operator to issue instructions and commands to, and receive information from, the storage controller 110.

Data volumes $22_a$, $22_b$, ..., $22_j$ are written to the disk device 20. The data is written to a volume, such as the first volume $22_a$, in tracks $24_a$, $24_b$, ..., $24_k$ and each track, such as the first track $24_a$ includes a number of records $26_a$, $26_b$, ..., $26_m$. A first record R0 serves as a marker, indicating the beginning of the track $24_a$. The following records, R1 through $R_m$, contain the actual customer data. A record header is stored for each record on the track. The header comprises metadata having a volume ID, with a device identifier, a track number and a track type, and an ordinal record number. Moreover, a regular or standard R0 begins with an 8 byte count field consisting of 2 bytes of physical cylinder number, 2 bytes of physical head number, 1 byte of record number (0), 1 byte of key length (0), and 2 bytes of data length (8); the data field will consist of all zeros.

Figure 2:
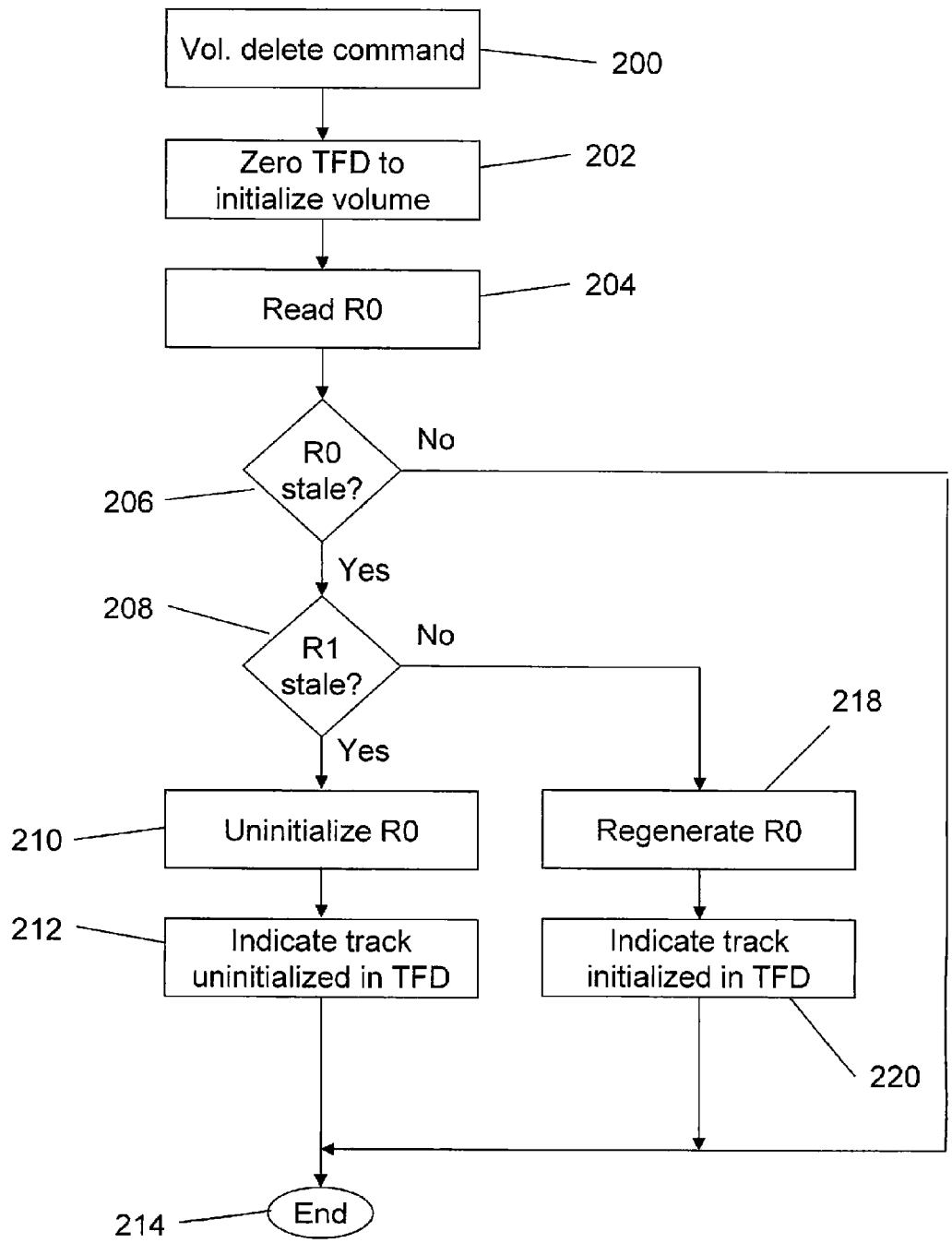
FIG. 2 is a flowchart of a method of the present invention.

Referring to the flowchart of FIG. 2, the present invention provides a method to delete a data volume $22_a$ from the storage system 100. The method may be executed by the processor 112 from program instructions stored in the memory 114, may performed by hardware, such as ASICs, or by a combination. The volume $22_a$ was previously initialized and data records $26_a, 26_b, \ldots, 26_m$ were written to a track $24_a$. The TFD 122 in the cache 120 reflects that the tracks $24_a$, $24_b, \ldots, 24_k$ have valid data. To delete the volume, a volume delete command is issued to the storage controller 110 (step 200). Any appropriate means may be used to issue the command, such as the user interface 30. The storage controller 110 then frees the deleted volume's allocated storage space and performs initialization on the storage space by only zeroing the associated TFD 122 metadata and the changes are hardened onto an HDD for a range of tracks $24_a, 24_b, \ldots, 24_k$ contained within the storage space (step 202). Through use of the user interface 30, a new volume is created which will reuse the newly initialized storage space. When the TFD metadata is not valid, then the track image is staged into memory and R0 is examined. The staged R0 will match the intended TFD, be all zeros, or mismatch what is expected. If R0 is zeros, it would indicate that the track is an uninitialized track. An R0 will be generated and treated normally as if the R0 from storage matched. If the track ID within the R0 saved in the storage does not match the expected volume's track ID and the sped up reconfiguration time was chosen, then a calculation is made to determine if the staged R0 track ID would be at the same track offset within an extent. The staged data is then considered residual data from a previously deleted storage object and treated as an uninitialized track. An attempt is made to read the record header (metadata) of the first record R0 $26_a$ of the track $24_a$ (step 204). If the record R0 $26_a$ is determined to be stale (step 206), a determination is then made as to whether the second record $26_b$, which is the first user record R1, is also stale (step 208). If R1 $26_b$ is stale, the first record R0 $26_a$ is uninitialized (step 210) by zeroing sector 0 and the TFD 122 for the track $24_a$ in the cache 120 is modified, such as by modifying the associated track metadata, to indicate that the track $24_a$ is uninitialized (step 212) and the process ends (step 214). Additionally, the stale record R0 $26_a$ can be replaced with a valid record R0 on a subsequent format write of R0 or in addition to a format write of R1.

If, on the other hand, the record R0 $26_a$ is determined to be stale (step 206) and the first user record R1 $26_b$ is not stale (step 208), this is an indication that the record R0 $26_a$ has become invalid or corrupted or that it was not initialized when the R1 was initialized. The record R0 $26_a$ is then regenerated based on its physical location (step 218) and the TFD is modified, such as by modifying the associated track metadata, to indicate that the track $24_a$ is initialized (step 220) and the process ends (step 214).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for erasing a data volume from a storage system or a method for deploying computing infrastructure comprising integrating computer readable code into a computing system for erasing a data volume from a storage system.

What is claimed is:

1. A method for managing deleted data volumes in a storage system, each volume including at least one track, each track including a plurality of records including a first record R0 and at least a second record R1, the first record R0 including a data field being in a state of all zeros when the track is uninitialized and the second record R1 for storing user data, a volume being in an initialized state and may be reused when a track format description (TFD) in metadata stored in a cache and associated with the tracks on the volume is zeroed leaving prior, stale user data in the storage space of the deleted volume, the method comprising:
   creating a new volume to reuse the storage space of a deleted volume;
   upon a determination that the TFD for the deleted volume is invalid:
      staging a track from the storage space used by the deleted volume into the cache;
      attempting to read the first record R0 of the staged track;
      determining whether the first record R0 is stale;
      if the first record R0 is stale, determining whether the second record R1 of the staged track is stale;
         if the second record R1 is stale:
            zeroing the first sector of the first record R0 to uninitialize the first record R0; and
            modifying the TFD in the cache to indicate that the staged track is uninitialized; and
         if the second record R1 is not stale:
            indicating that the first record R0 is invalid or corrupted;
            regenerating the first record R0 based on its physical location; and
            modifying the TFD in the cache to indicate that the staged track is initialized.

2. The method of claim 1, wherein modifying the TFD comprises modifying associated cache metadata.

3. The method of claim 1, further comprising, if the first record R0 is stale, replacing the first record R0 with a valid first record R0.

4. A method for deploying computing infrastructure, comprising integrating computer readable code into a computing system storing data volumes, each volume including at least one track, each track including a plurality of records including a first record R0 and at least a second record R1, the first record R0 including a data field being in a state of all zeros when the track is uninitialized and the second record R1 for storing user data, a volume being in an initialized state and may be reused when a track format description (TFD) in metadata stored in a cache and associated with the tracks on the volume is zeroed leaving prior, stale user data in the storage space of the deleted volume, wherein the code, in combination with the computing system, is capable of performing the following:

creating a new volume to reuse the storage space of a deleted volume;
upon a determination that the TFD for the deleted volume is invalid:
staging a track from the storage space used by the deleted volume into the cache;
attempting to read a first record R0 of a track;
if the first record R0 is stale, determining whether a first user record R1 of the volume is stale;
if the first user record R1 is stale:
uninitializing the first record R0; and
modifying a track format description (TFD) whereby the entire track is indicated as being uninitialized; and
if the first user record R1 is not stale:
indicating that the first record R0 is invalid or corrupted;
regenerating the first record R0 based on its physical location; and
modifying the TFD whereby the entire track is indicated as being initialized.

5. The method of claim 4, wherein modifying the TFD comprises modifying associated cache metadata.

6. The method of claim 4, further comprising, if the first record R0 is stale, replacing the first record R0 with a valid first record R0.

7. A data storage controller for managing data volumes stored in tracks recorded on a storage device, each volume including at least one track, each track including a plurality of records including a first record R0 and at least a second record R1, the first record R0 including a data field being in a state of all zeros when the track is uninitialized and the second record R1 for storing user data, a volume being in an initialized state and may be reused when a track format description (TFD) in metadata stored in a cache and associated with the tracks on the volume is zeroed leaving prior, stale user data in the storage space of the deleted volume, the controller comprising:

a cache for storing metadata associated with data stored in a track of a first volume; and
a processor programmed to:
create a new volume to reuse the storage space of a deleted volume;
upon a determination that the TFD for the deleted volume is invalid:
stage a track from the storage space used by the deleted volume into the cache;
attempt to read the first record R0;
if the first record R0 is stale, determine whether a first user record R1 of the volume is stale;
if the first user record R1 is stale:
uninitialize the first record R0; and
modify a track format description (TFD) whereby the entire track is indicated as being uninitialized; and
if the first user record R1 is not stale:
indicate that the first record R0 is invalid or corrupted;
regenerate the first record R0; and
modify the TFD whereby the entire track is indicated as being initialized.

8. The data storage controller of claim 7, wherein the processor is programmed to modify the TFD by modifying the associated cache metadata.

9. The data storage controller of claim 7, wherein the processor is further programmed to replace the first record R0 with a valid first record R0 if the first record R0 is stale.

10. A computer program product of a non-transitory computer readable medium usable with a programmable computer, the computer program product having computer-readable code embodied therein for deleting data volumes from a storage system, each volume including at least one track, each track including a plurality of records including a first record R0 and at least a second record R1, the first record R0 including a data field being in a state of all zeros when the track is uninitialized and the second record R1 for storing user data, a volume being in an initialized state and may be reused when a track format description (TFD) in metadata stored in a cache and associated with the tracks on the volume is zeroed leaving prior, stale user data in the storage space of the deleted volume, the computer-readable code comprising instructions for:

creating a new volume to reuse the storage space of a deleted volume;
upon a determination that the TFD for the deleted volume is invalid:
staging a track from the storage space used by the deleted volume into the cache;
attempting to read a first record R0 of a track;
if the first record R0 is stale, determining whether a first user record R1 of the volume is stale;
if the first user record R1 is stale:
uninitializing the first record R0; and
modifying a track format description (TFD) whereby the entire track is indicated as being uninitialized; and
if the first user record R1 is not stale:
indicating that the first record R0 is invalid or corrupted;
regenerating the first record R0; and
modifying the TFD whereby the entire track is indicated as being initialized.

11. The computer program product of claim 10, wherein the instructions for modifying the TFD comprise instructions for modifying associated cache metadata.

12. The computer program product of claim 10, further comprising instructions for, if the first record R0 is stale, replacing the first record R0 with a valid first record R0.

* * * * *